United States Patent [19]

Heisinger

[11] 4,215,381

[45] Jul. 29, 1980

[54] PROTECTOR MODULE FOR TELEPHONE CIRCUITS

[75] Inventor: Robert F. Heisinger, Parsippany-Troy Hills Township, Morris County, N.J.

[73] Assignee: Bell Telephone Laboratories, Incorporated, Murray Hill, N.J.

[21] Appl. No.: 945,445

[22] Filed: Sep. 25, 1978

[51] Int. Cl.[2] .......................... H02H 9/02; H02H 7/20

[52] U.S. Cl. .................................... 361/124; 361/119; 337/32

[58] Field of Search ......................... 361/124, 117-119, 361/56, 54, 55, 57, 120, 125; 337/15-20, 28-34

[56] References Cited

U.S. PATENT DOCUMENTS

| | | | |
|---|---|---|---|
| 3,573,695 | 4/1971 | Geyer et al. . | |
| 3,818,271 | 6/1974 | Baumbach | 361/124 X |
| 4,004,192 | 1/1977 | Carney | 361/124 |
| 4,004,263 | 1/1977 | Carney | 361/124 X |
| 4,057,692 | 11/1977 | Debortoli et al. . | |
| 4,074,337 | 2/1978 | Debortoli et al. | 361/124 |

OTHER PUBLICATIONS

Cook Electric Co. Price List, May 15, 1978, pp. A1-5-A16, The type 4A-Heat Coil and MESA Carbon Protector Module.

*Primary Examiner*—Patrick R. Salce
*Attorney, Agent, or Firm*—John W. Fisher

[57] ABSTRACT

An electrical protector assembly (100) for grounding excessive voltages and excessive currents encountered on a telecommunication line circuit includes a heat coil subassembly (103) for sensing the excessive currents and apparatus (102 and 104) axially aligned with the heat coil assembly for conducting the excessive voltages to ground. When excessive currents are encountered on the line circuit, the protector provides a direct metallic contact (151 and 102) between the line circuit and ground. The internal arrangement of the protector allows both carbon blocks (180 and 181) and gas tube protectors (196) to be used as excessive voltage protection devices. In addition, miniature electronic circuits, such as minibridge lifters (195), may be advantageously incorporated into the protector module.

6 Claims, 6 Drawing Figures

PROTECTOR MODULE FOR TELEPHONE CIRCUITS

BACKGROUND OF THE INVENTION

1. Technical Field of the Invention

This invention relates to electrical safety devices and, in particular, to an electrical protector module for protecting telephone circuits against excessive voltages and excessive currents.

2. Description of the Prior Art

Telephone circuit protector modules, as exemplified by J. B. Geyer et al U.S. Pat. No. 3,573,695 issued Apr. 6, 1971, are comprised of a pair of assemblies each of which has a spark gap protector for excessive voltages and a heat coil protector for excessive currents. A spring, held in abutment with the heat coil assembly, propels a pin into engagement with a grounding circuit during the passage of excessive currents through the heat coil.

While modules such as this have proved very useful in protecting various telehone circuits from excessive voltages and currents, these protectors exhibit a number of shortcomings. For example, to complete the path to ground the pin in the heat coil assembly must be brought into contact with a carbon block in the spark gap protector assembly. If the current level is sufficiently high, heat is developed in the carbon block assembly. This heat may be sufficient to melt certain plastic elements in the module. In addition, the heat coil assembly is so configured that an insulative member, which electrically isolates a line plate from the grounding circuit during normal operation, can become distorted. This distortion results in intermittent contact with the grounding circuit during the passage of excessive currents through the heat coil pin. A further disadvantage is that the physical arrangement of the heat coil assembly utilizes excessive space within the protector module.

More recent advances in the design of protector modules are illustrated in W. V. Carney U.S. Pat. No. 4,004,192 issued Jan. 18, 1977, and W. V. Carney U.S. Pat. No. 4,004,263 issued Jan. 18, 1977. In the Carney '192 patent the module includes a shaftlike plunger and a coil spring for urging the plunger in a direction toward a carbon block having a recess therein. During normal operation, current is conducted through the spring and plunger to an external contact. Upon actuation of the heat coil, the plunger is moved toward the carbon block and is brought into contact with a laterally extending conductive member, thereby causing conduction from the plunger to ground.

In Carney '263 the module includes a relatively fixed retaining member slidably fitted relative to a plunger similar to that disclosed in Carney '192. In addition, there is an annular compressible electrically conductive member positioned between the retaining member and a portion of the plunger to provide electrical communication between the two irrespective of the relative position between the plunger and the fixed retaining member.

The designs exhibited by the two aforementioned patents are such that internal space must be available to permit the plunger to move into contact with the recess in the carbon block. By virtue of this arrangement, the use of gas tube protectors in place of carbon blocks is precluded. The need for recesses in the carbon blocks further precludes heat shielding of these elements. Since the carbon blocks are provided with recesses, oftentimes tiny particles are produced which drop into the spark gap shorting it out. As a result, normal spark gap type operation is oftentimes precluded.

In addition to the foregoing deficiencies, the placement of the heat coil above the spring in Carney '192 results in a relatively long delicate wire being exposed. This exposed wire can be easily damaged or broken during assembly of the protector.

A more recent example of a protector module is disclosed in G. DeBortoli et al U.S. Pat No. 4,057,692 issued Nov. 8, 1977. The DeBortoli et al patent in general relates to a protector apparatus for telecommunication lines. However, FIGS. 4–9 specifically disclose a protector module. This module is very similar to those designs discussed previously.

SUMMARY OF THE INVENTION

The foregoing shortcomings and deficiencies in the prior art designs of protector modules are overcome in an electrical protector assembly for protecting a circuit against excessive voltages and excessive currents. This assembly includes an insulative base subassembly and a ground plate subassembly slidably coupled to the base subassembly. A heat coil subassembly, for sensing the excessive currents, includes a spool having a first conductive flange on one end, windings of resistance wire about an outer surface, and a pin affixed to an inner surface by a thin coating of solder. The protector assembly further includes apparatus, axially aligned with the heat coil subassembly, for conducting excessive voltages from the heat coil subassembly pin to the ground plate subassembly. The heat coil subassembly also includes a second conductive flange spaced apart and isolated from the first flange by an insulative member. One end of the resistance wire windings is connected to the spool and an opposite end of these windings is connected to the second flange. Also included is apparatus, surrounding the heat coil subassembly and in contact with the second flange, for urging the heat coil subassembly first flange from a first position spaced apart from the ground plate subassembly to a second position in contact with the ground plate subassembly upon passage of excessive currents through the resistance wire windings.

Several advantages are to be derived from this illustrative embodiment. For emample, the absence of recesses in the carbon blocks allows these blocks to be enclosed in a metallic heat shield. Since the need for recesses in the carbon blocks is avoided, problems caused by tiny particles trapped in the spark gap are diminished. Also, this arrangement permits gas tubes to be incorporated into the protector module in place of carbon block spark gap protectors.

The heat coil pin is in direct contact with the carbon blocks. This eliminates the need for additional internal space to permit pin movement. Contact between the heat coil pin and a line plate is by means of a snap-clip type connection rather than spring loaded retention between the carbon block and the heat coil.

A further advantage of one embodiment of this invention is that the body of the heat coil is inside the helix of the spring. This arrangement virtually eliminates any potential damage to the delicate heat coil wire during assembly.

The insulator separating the line and central office sides of the heat coil is mechanically in compression instead of tension. This arrangement virtually eliminates any possibility of intermittent connections between a line circuit and ground upon the occurrence of excessive currents which actuate the heat coil protector.

With only minor internal changes the protector module can advantageously accommodate electronic packages, such as a minibridge lifter, while requiring no changes in the external configuration.

Finally, a direct metallic line-to-ground circuit is produced by actuation of the heat coil current sensing mechanism.

BRIEF DESCRIPTION OF THE DRAWINGS

The aforementioned advantages of my invention as well as other advantages will be better understood upon consideration of the following detailed description and the appended claims taken in conjunction with the attached drawings of an illustrative embodiment in which:

DETAILED DESCRIPTION

Figures 1, 2:
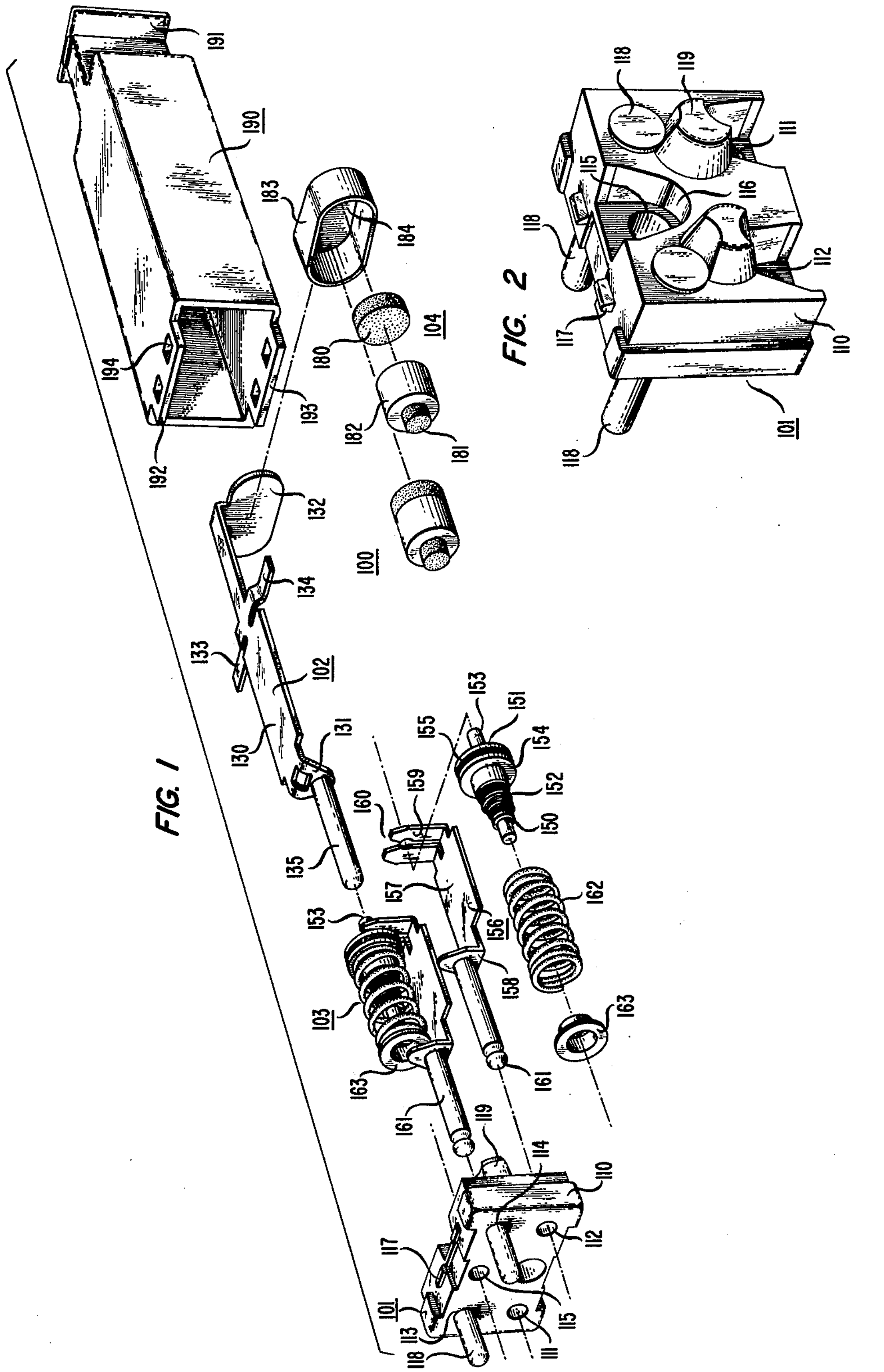
FIG. 1 is an exploded perspective view of the protector module.
FIG. 2 is a perspective view of the insulative base subassembly.

An electrical protector 100 for grounding excessive voltages and excessive currents encountered on a telecommunication line circuit (not shown) is illustrated in FIG. 1. Protector 100, which utilizes modular construction, is comprised of four major subassemblies. These subassemblies are an insulative base subassembly 101, a ground plate subassembly 102, a heat coil subassembly 103, and an excessive voltage protector subassembly 104. A complete protector serves each of two line circuits, commonly called tip and ring circuits. The mechanical arrangement of each subassembly will be described first after which the electrical operation will be discussed.

1. Mechanical Construction

First consider insulative base subassembly 101 shown most clearly in FIG. 2. This subassembly is comprised of a rectangular cross-sectioned member 110 which has first and second pairs of spaced apart apertures 111–112 and 113–114 therein. An additional aperture 115 is intermediate apertures 113 and 114. Surrounding each of apertures 111, 112 and 115 in the inner surface are generally V-shaped indentations 116. The purpose for apertures 111, 112 and 115 and for indentations 116 will become apparent subsequently.

On oppositely disposed top and bottom faces of rectangular member 110 are first and second spaced apart generally triangular-sectioned barbs 117. Fixed in apertures 113 and 114 are conductive pins 118. Conductive pins 118 serve as an output connection between electrical protector 100 and a line circuit (not shown). Extending outwardly from an interior face of rectangular member 110 are a pair of truncated, conelike projections 119 the purpose of which will be made apparent shortly.

Next consider ground plate subassembly 102. This subassembly is comprised of a generally elongated electrically conductive member 130. At one end of member 130 is a first generally inverted V-shaped bend 131. At an opposite end of member 130 is a generally elliptically-shaped bend 132. The elliptically-shaped bend 132 extends laterally from either side of elongated member 130 a distance approximately one-half the width of elongated member 130. At an intermediate point along the length of member 130, there are first and second oppositely directed raised tabs 133 and 134.

Inverted V-shaped bend 131 and elliptically-shaped bend 132 lie in first and second planes respectively, which are generally parallel with one another and generally perpendicular to a plane containing elongated member 130. End portions of the first and second oppositely directed raised tabs 133 and 134 lie in a common plane parallel with the plane containing elongated member 130.

Affixed to V-shaped bend 131 is an electrically conductive pin 135. Pin 135 and V-shaped bend 131, when brought into engagement with intermediate aperture 115 and its associated generally V-shaped indentation 116, slidably couple elongated member 130 to insulative base subassembly 101 in a polarized fashion.

Heat coil subassembly 103 is provided for sensing any excessive currents. This subassembly includes a metallic spool 150 which has a first conductive flange 151 on one end. Wound around an outer surface of spool 150 are several windings of resistance wire 152. Affixed to an inner surface of spool 150 is a conductive pin 153. Pin 153 is held in place inside spool 150 during normal operating conditions by a thin coating of solder which is not visibly apparent in FIG. 1.

Intermediate first conductive flange 151 and resistance wire windings 152 is a second conductive flange 154. Flange 154 is spaced apart and electrically isolated from flange 151 by an insulative member 155. Insulative member 155 (shown cross-hatched in FIGS. 3 and 4) is sandwiched in compression between flanges 151 and 154. One end of resistance wire winding 152 is connected to spool 150 and an opposite end of wire windings 152 is connected to second flange 154.

Figure 3:
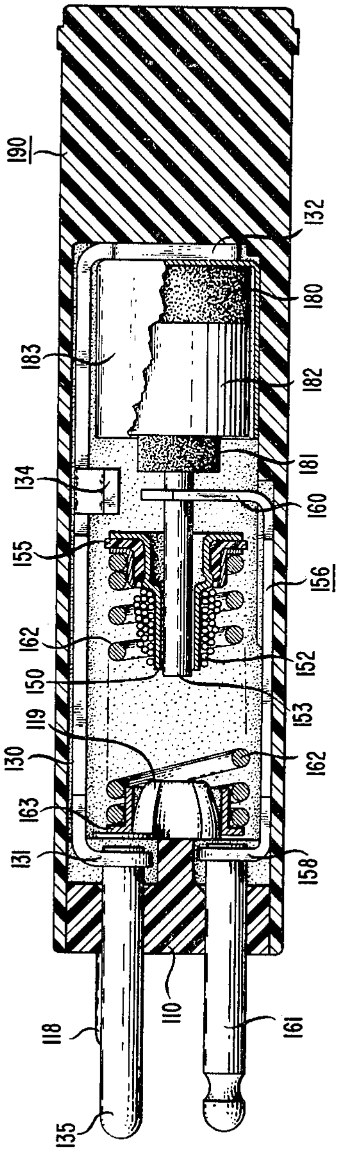
FIG. 3 is a side view of an assembled protector illustrating a slotted beam connector arrangement for holding the heat coil assembly in position within the protector module.

Heat coil subassembly 103 is held in position, as shown in FIG. 3, by electrically conductive holder 156. Holder 156 is comprised of a generally rectangular-shaped member 157 having a generally V-shaped bend 158 at one end and a generally square-shaped bend 159 at an opposite end. Square-shaped bend 159 is configured to form a slotted beam contact 160. V-shaped bend 158 and square-shaped bend 159, along with its associated slotted beam contact 160, are generally parallel to one another and generally perpendicular to rectangular-shaped member 157. Affixed to V-shaped bend 158 is an electrically conductive pin 161 which serves as an input connection to the protector assembly 100. Pin 161 slidably couples holder 156 to the insulative base subassembly 101. By virtue of V-shaped bend 158 and V-shaped indentation 116 around apertures 111 and 112, this coupling is advantageously achieved in a polarized fashion.

Figure 4:
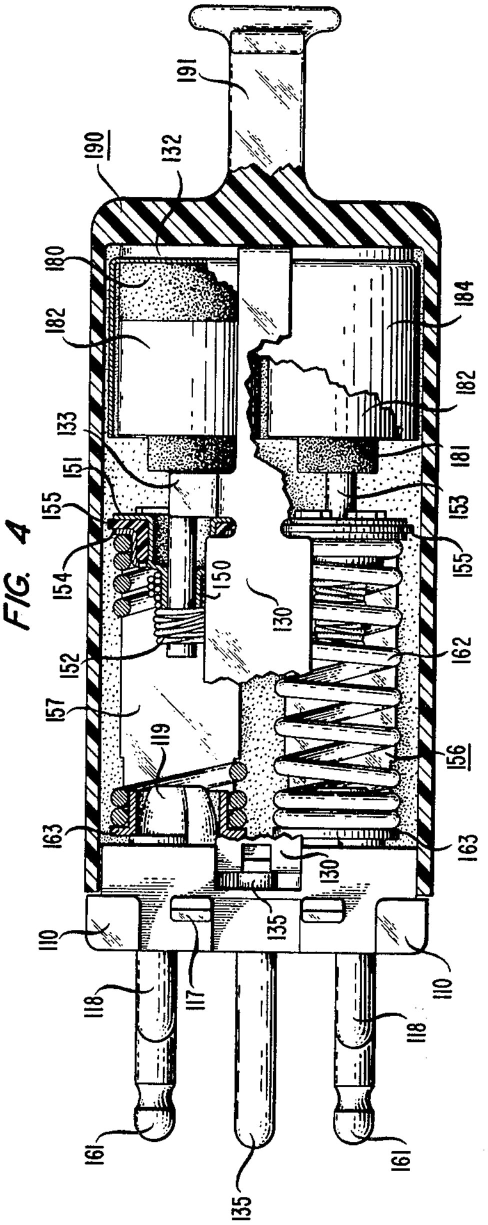
FIG. 4 is a top view of an assembled protector illustrating the placement of the heat coil within the spring helix.

Surrounding a portion of heat coil subassembly 103, as shown in FIG. 4, and in contact with second conductive flange 154 is helical spring 162. Upon passage of excessive currents through resistance wire windings 152, spring 162 urges conductive flange 151 from a first position spaced apart from ground plate subassembly 102 to a second position in contact with one of the oppositely directed raised tabs 133 or 134.

It should be noted that the end turns of spring 162 have cross-sectional thicknesses of decreasing dimensions to ensure a relatively broad based coupling to either flange 154 or base subassembly 101. Affixed to the end of spring 162 opposite the end in contact with flange 154 there is a flange 163. Flange 163 has a cylindrical projection extending perpendicularly therefrom. This projection has a reduced diameter at an intermediate point along its length so that the end turns of spring 162 are securely coupled to flange 163 to produce a generally flat end surface for engagement with conductive pin 118 when heat coil subassembly 103 is slidably coupled to base subassembly 101. Spring 162 is held in axial alignment within protector 100 by truncated, conelike projection 119.

Excessive voltages from heat coil subassembly pin 153 are conducted to ground plate subassembly 102 by excessive voltage protector subassembly 104. Voltage protector subassembly 104, which is axially aligned with heat coil subassembly 103, is comprised of first and second carbon blocks 180 and 181 and an insulative holder 182. Insulative holder 182 holds carbon block 181 such that it is axially aligned with and spaced apart from carbon block 180. The spacing produces a spark gap distance of approximately 3 mils.

Carbon blocks 180 and 181 are solid right circular cylinders with block 180 having a diameter which is larger than the diameter of carbon block 181. Furthermore, carbon block 180 has a thickness which is smaller than the thickness of carbon block 181. Insulative holder 182 is a partially hollow right circular cylinder of ceramic, one end of which has an aperture therein just slightly larger than the diameter of carbon block 181. This aperture receives and aligns carbon block 181 with carbon block 180.

Encasing adjacent pairs of carbon blocks 180 and 181, except for an end face of carbon block 181, is a conductive can comprised of a generally elliptically-shaped hollow sleeve 183 and an end face 184 integral with an edge of sleeve 183.

Enclosing ground plate subassembly 102, heat coil subassembly 103, and voltage protector subassembly 104 is a generally rectangular cross-sectioned cover 190. Integral with an enclosed end of cover 190 is a finger grip 191 which facilitates handling of protector assembly 100. On opposite faces of cover 190 and extending outwardly therefrom are first and second projections 192 and 193. Each of projections 192 and 193 has a pair of spaced apart apertures 194 therein. Projections 192 and 193 extend over insulative base subassembly 101 when cover 190 is brought into engagement with base subassembly 101. Upon engagement apertures 194 are grasped by barbs 117 on rectangular member 110 to securely hold cover 190 to base subassembly 101.

2. Electrical Operation

In normal operation, current from a line circuit (not shown) is coupled through pin 161, holder 156, and slotted beam contact 160 to pin 153 in heat coil subassembly 103. The current then passes into spool 150 and thence through resistance wire winding 152 to second flange 154, through spring 162 and flange 163, and then to output pin 118 in insulative base subassembly 101. If the current becomes excessive, resistance wire winding 152 heats spool 150 melting the thin coating of solder (not visible in FIG. 1) freeing heat coil subassembly 103 for movement. Once heat coil subassembly 103 is free to move it is urged by spring 162 into engagement with one of the oppositely directed raised tabs 133 or 134 on ground plate subassembly 102. The engagement of conductive flange 151 with tab 133 or 134 thereby diverts the flow of current from the line circuit to ground via conductive pin 135.

With respect to excessive voltages, the input circuit path is identical to that followed by the current. However, once an excessive voltage appears on pin 153 in heat coil subassembly 103, the voltage is coupled via the direct contact between pin 153 and carbon block 181 to the spark gap established between carbon block 181 and 180. The voltage is then coupled, through the intimate contact of carbon block 180 and conductive sleeve 183, to elliptically-shaped bend 132 and back to ground through ground plate subassembly 102.

Figure 5:
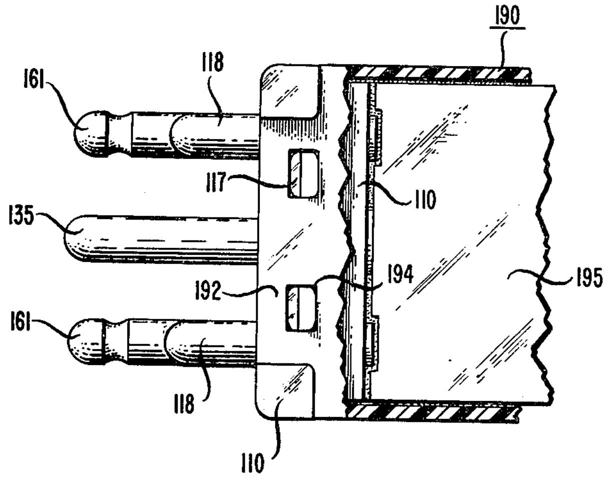
FIG. 5 is a partial top view of the protector module illustrating incorporation of a miniature electronics package, such as a minibridge lifter, into the protector module.

As shown in FIG. 5, with minor internal rearrangement protector module 100 can be advantageously adapted to accommodate miniature electronic circuits such as a minibridge lifter 195. This circuit would be housed in protector 100 at an interface between insulative base subassembly 101 and heat coil subassembly 103.

Figure 6:
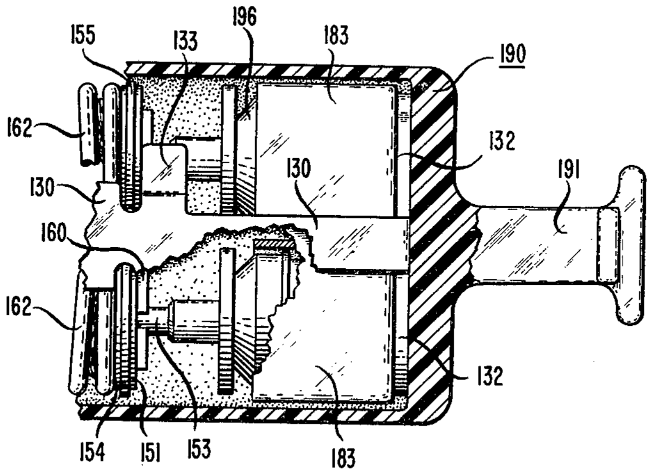
FIG. 6 is a partial top view illustrating the incorporation of gas tube protectors into the module as replacements for the carbon block protectors.

By virtue of the intimate contact between pin 153 of heat coil subassembly 103 and carbon block 181, voltage protector subassembly 104 as heretofore described may be advantageously replaced with a gas tube type voltage protector 196 as shown in FIG. 6. A gas tube protector suitable for this purpose is disclosed in F. G. Scudner, Jr. U.S. Pat. No. 3,898,533 issued Aug. 5, 1975.

In all cases it is to be understood that the above described embodiment is illustrative of but a small number of many possible specific embodiments which can represent application of the principles of the invention. Thus, numerous and various other embodiments can be devised readily in accordance with these principles by those skilled in the art without departing from the spirit and scope of the invention.

I claim:

1. An electrical protector assembly for protecting a circuit against excessive voltages and excessive currents including:

an insulative base subassembly;

a ground plate subassembly slidably coupled to said base subassembly;

a heat coil subassembly for sensing said excessive currents, this subassembly including a spool having a first conductive flange on one end, windings of resistance wire about an outer surface, and a pin affixed to an inner surface by a thin coating of solder; and means, axially aligned with said heat coil subassembly, for conducting said excessive voltages from said heat coil subassembly pin to said ground plate subassembly characterized in that said heat coil subassembly further includes a second conductive flange spaced apart and isolated from said first flange by an insulative member, one end of said resistance wire windings being connected to said spool and an opposite end of said resistance wire windings being connected to said second flange; and means, surrounding a portion of said heat coil subassembly and in contact with said second flange, for urging said heat coil subassembly first flange from a first position spaced apart from said ground plate subassembly to a second position in contact with said ground plate subassembly upon passage of said excessive currents through said resistance wire windings.

2. The electrical protector assembly in accordance with claim 1 wherein said insulative member is sandwiched in compression between said first and second flanges.

3. An electrical protector assembly for protecting a circuit against excessive voltages and excessive currents including:

an insulative base subassembly;

a ground plate subassembly slidably coupled to said base subassembly;

a heat coil subassembly for sensing said excessive currents, this subassembly including a spool having a first conductive flange on one end, windings of resistance wire about an outer surface, and a pin affixed to an inner surface by a thin coating of solder; and means axially aligned with said heat coil subassembly for conducting said excessive voltages from said heat coil subassembly, a second conductive flange spaced apart and isolated from said first flange by an insulative member, one end of said resistance wire windings being connected to said spool and an opposite end of said resistance wire windings being connected to said second flange; and means surrounding a portion of said heat coil subassembly and in contact with said second flange for urging said heat coil subassembly first flange from first position spaced apart from said ground plate subassembly to a second position in contact with said ground plate subassembly upon passage of said excessive currents through said resistance wire windings, ground plate subassembly comprising, an elongated electrically conductive member having a first generally inverted V-shaped bend at one end;

a second generally elliptically-shaped bend at an opposite end, said second bend extending laterally a predetermined distance to either side of said elongated member; and first and second oppositely directed raised tabs extending outwardly from said elongated member at an intermediate point along its length;

said first and second bends lying in first and second planes, respectively, which are generally parallel with one another and generally perpendicular to a plane containing said elongated member, and end portions of said first and second tabs lying in a common plane parallel with said plane containing said elongated member; and a second electrically conductive pin affixed to said first generally V-shaped bend for slidably coupling said elongated member to said insulative base subassembly, said excessive voltages conducting means comprising first and second carbon blocks;

insulative means for holding said second block such that it is axially aligned with said first block and said first and second blocks are axially spaced apart from one another by a predetermined distance to form a spark gap; and conductive means for encasing an adjacent pair of said first and second carbon blocks except for end faces of said second blocks.

4. The electrical protector assembly in accordance with claim 3 wherein said conductive encasing means comprises:

a generally elliptically-shaped hollow sleeve; and an end face integral with an edge of said sleeve.

5. The electrical protector assembly in accordance with claim 3 wherein said urging means comprises:

an electrically conductive helical spring end turns of which have a cross-sectional thickness of decreasing dimensions; and a flange having a cylindrical projection extending perpendicularly therefrom, said projection having a reduced diameter at an intermediate point along its length so that said end turns of said spring are securely coupled to said flange to produce a generally flat end surface for engagement with said third conductive pin.

6. An electrical protector assembly for protecting a circuit against excessive voltages and excessive currents including:

an insulative base subassembly;

a ground plate subassembly slidably coupled to said base subassembly;

a heat coil subassembly for sensing said excessive currents, said subassembly including a spool having a first conductive flange on one end, windings of resistance wire about an outer surface, and a pin affixed to an inner surface by a thin coating of solder; and means axially aligned with said heat coil subassembly for conducting said excessive voltages from said heat coil subassembly pin to said ground plate subassembly, a second conductive flange spaced apart and isolated from said first flange by an insulative member, said insulative member being sandwiched in compression between said first and second flanges, one end of said resistance wire winding being connected to said spool and an opposite end thereof being connected to said second flange; and means surrounding a portion of said heat coil subassembly and in contact with said second flange for urging said heat coil subassembly first flange from a first position spaced apart from said ground plate subassembly to a second position in contact with said ground plate subassembly upon passage of said excessive currents through said resistance wire windings, holding means consisting of a generally rectangular-shaped electrically conductive member having a first generally inverted V-shaped bend at one end; and a second generally squared-shaped bend at an opposite end, said second bend configured to form a slotted beam contact for engaging said pin of said heat coil subassembly to hold it in said first position, said first and second bends being generally perpendicular to said rectangular-shaped member; and a first electrically conductive pin affixed to said first bend for slidably coupling said rectangular-shaped conductive member to said insulative base subassembly.

* * * * *